(12) United States Patent
Christmann et al.

(10) Patent No.: US 10,354,614 B2
(45) Date of Patent: Jul. 16, 2019

(54) TECHNIQUE FOR COLOR MANAGEMENT FOR A SET OF DISPLAY DEVICES

(71) Applicant: e.solutions GmbH, Ingolstadt (DE)

(72) Inventors: Stefan Christmann, Geislingen/Steige (DE); Thomas Franke, Laupheim (DE)

(73) Assignee: E.SOLUTIONS GMBH, Ingolstadt (DE)

( * ) Notice: Subject to any disclaimer, the term of this patent is extended or adjusted under 35 U.S.C. 154(b) by 77 days.

(21) Appl. No.: 15/249,889

(22) Filed: Aug. 29, 2016

(65) Prior Publication Data

US 2017/0069293 A1    Mar. 9, 2017

(30) Foreign Application Priority Data

Sep. 4, 2015   (EP) .................................... 15002611

(51) Int. Cl.
   *G06F 3/14* (2006.01)
   *G09G 3/20* (2006.01)
   *G09G 5/04* (2006.01)

(52) U.S. Cl.
   CPC ............. *G09G 5/04* (2013.01); *G06F 3/1423* (2013.01); *G09G 3/20* (2013.01); *G09G 2320/043* (2013.01); *G09G 2320/0686* (2013.01); *G09G 2320/08* (2013.01); *G09G 2340/06* (2013.01); *G09G 2354/00* (2013.01); *G09G 2380/10* (2013.01)

(58) Field of Classification Search
   CPC ................................. G09G 5/04; G06F 3/1446
   See application file for complete search history.

(56) References Cited

U.S. PATENT DOCUMENTS

| | | |
|---|---|---|
| 2002/0003544 A1 | 1/2002 | Ohtsuka et al. |
| 2005/0036159 A1 | 2/2005 | Sharma |
| 2006/0202630 A1* | 9/2006 | Yamada ............... G09G 3/3208 315/169.2 |
| 2008/0018570 A1* | 1/2008 | Gerets .................. G09G 3/3208 345/84 |

(Continued)

OTHER PUBLICATIONS

European Search Report, Applicant: e.solutions GmbH, European Application No. 15002611, Examiner: Michael Gartlan, Date of Completion: Jun. 20, 2016, pp. 1-8.

(Continued)

*Primary Examiner* — Shivang I Patel
(74) *Attorney, Agent, or Firm* — Tarolli, Sundheim, Covell & Tummino LLP

(57) ABSTRACT

A display color management device includes instructions to access color profile data for each display device of a set of display devices. The color profile data is indicative of a relationship between digital color values input into a respective display device and associated physical color values displayed by the respective display device. The color profile data is representative of a color gamut of the respective display device. An overlap color gamut is determined as an overlap of all color gamuts of the set of display devices based on the color profile data. Conversion information for each display device of the set of display devices is determined based on the color profile data and based on the overlap color gamut, wherein the conversion information is configured to convert an input digital color value to dedicated output digital color values for two or more of the display devices.

20 Claims, 14 Drawing Sheets

(56) References Cited

U.S. PATENT DOCUMENTS

2011/0242142 A1* 10/2011 Hussain ............... G06F 3/1446
345/690
2012/0139937 A1* 6/2012 Marcu ................. G09G 3/2003
345/590

OTHER PUBLICATIONS

Partial European Search Report, Applicant: e.solutions GmbH, European Application No. 15002611, Examiner: Michael Gartlan, Date of Completion: Mar. 15, 2016, pp. 1-16.

* cited by examiner

LUT 1

| Digital color | | | Physical color (screen 1) | | |
|---|---|---|---|---|---|
| R | G | B | Y | x | y |
| 0 | 0 | 0 | 3,5 | 0,14 | 0,2 |
| 0 | 0 | 10 | | | |
| 0 | 10 | 0 | | | |
| ... | ... | ... | | | |
| 255 | 255 | 210 | | | |
| 255 | 255 | 255 | 600 | 0,31 | 0,31 |

Fig. 6a

LUT 2

| Digital color | | | Physical color (screen 2) | | |
|---|---|---|---|---|---|
| R | G | B | Y | x | y |
| 0 | 0 | 0 | 2,1 | 0,16 | 0,19 |
| 0 | 0 | 10 | | | |
| 0 | 10 | 0 | | | |
| ... | ... | ... | | | |
| 255 | 255 | 210 | | | |
| 255 | 255 | 255 | 535 | 0,32 | 0,32 |

Fig. 6b

Matrices (Display A or B → Ga*)

$$\begin{pmatrix} R\_r \\ G\_r \\ B\_r \end{pmatrix} = \begin{pmatrix} a\_11 & a\_12 & a\_13 \\ a\_21 & a\_22 & a\_23 \\ a\_31 & a\_32 & a\_33 \end{pmatrix} \begin{pmatrix} 255 \\ 0 \\ 0 \end{pmatrix} \quad \text{Red}$$

$$\begin{pmatrix} R\_g \\ G\_g \\ B\_g \end{pmatrix} = \begin{pmatrix} R\_r/255 & a\_12 & a\_13 \\ G\_r/255 & a\_22 & a\_23 \\ B\_r/255 & a\_32 & a\_33 \end{pmatrix} \begin{pmatrix} 0 \\ 255 \\ 0 \end{pmatrix} \quad \text{Green}$$

$$\begin{pmatrix} R\_b \\ G\_b \\ B\_b \end{pmatrix} = \begin{pmatrix} R\_r/255 & R\_g/255 & a\_13 \\ G\_r/255 & G\_g/255 & a\_23 \\ B\_r/255 & B\_g/255 & a\_33 \end{pmatrix} \begin{pmatrix} 0 \\ 0 \\ 255 \end{pmatrix} \quad \text{Blue}$$

$$\begin{pmatrix} R\_w \\ G\_w \\ B\_w \end{pmatrix} = \begin{pmatrix} R\_r/255 & R\_g/255 & R\_b/255 \\ G\_r/255 & G\_g/255 & G\_b/255 \\ B\_r/255 & B\_g/255 & B\_b/255 \end{pmatrix} \begin{pmatrix} 255 \\ 255 \\ 255 \end{pmatrix} \quad \text{White (optional)}$$

$$\begin{pmatrix} R' \\ G' \\ B' \end{pmatrix} = \begin{pmatrix} R\_r/255 & R\_g/255 & R\_b/255 \\ G\_r/255 & G\_g/255 & G\_b/255 \\ B\_r/255 & B\_g/255 & B\_b/255 \end{pmatrix} \begin{pmatrix} R\_* \\ G\_* \\ B\_* \end{pmatrix} \quad \text{Matrix}$$

Fig. 9

Matrices (Display A → Ga*)

$$\begin{pmatrix} 240 \\ 10 \\ 0 \end{pmatrix} = \begin{pmatrix} a\_11 & a\_12 & a\_13 \\ a\_21 & a\_22 & a\_23 \\ a\_31 & a\_32 & a\_33 \end{pmatrix} \begin{pmatrix} 255 \\ 0 \\ 0 \end{pmatrix} \quad \text{Red}$$

$$\begin{pmatrix} 10 \\ 230 \\ 0 \end{pmatrix} = \begin{pmatrix} 240/255 & a\_12 & a\_13 \\ 10/255 & a\_22 & a\_23 \\ 0 & a\_32 & a\_33 \end{pmatrix} \begin{pmatrix} 0 \\ 255 \\ 0 \end{pmatrix} \quad \text{Green}$$

$$\begin{pmatrix} 0 \\ 0 \\ 255 \end{pmatrix} = \begin{pmatrix} 240/255 & 10/255 & a\_13 \\ 10/255 & 230/255 & a\_23 \\ 0 & 0 & a\_33 \end{pmatrix} \begin{pmatrix} 0 \\ 0 \\ 255 \end{pmatrix} \quad \text{Blue}$$

$$\begin{pmatrix} 240/255 & 10/255 & 0 \\ 10/255 & 230/255 & 0 \\ 0 & 0 & 1 \end{pmatrix} \quad C_A$$

$$\begin{pmatrix} 250 \\ 240 \\ 255 \end{pmatrix} = \begin{pmatrix} 240/255 & 10/255 & 0 \\ 10/255 & 230/255 & 0 \\ 0 & 0 & 1 \end{pmatrix} \begin{pmatrix} 255 \\ 255 \\ 255 \end{pmatrix} \quad \text{White Point}$$

Fig. 10

TECHNIQUE FOR COLOR MANAGEMENT FOR A SET OF DISPLAY DEVICES

CROSS-REFERENCE TO RELATED APPLICATION

The present application claims priority under 35 U.S.C. § 119 from European Patent Application No. 15 002 611.0, filed 4 Sep. 2015, and entitled TECHNIQUE FOR COLOR MANAGEMENT FOR A SET OF DISPLAY DEVICES, which is incorporated herein by reference in its entirety.

TECHNICAL FIELD

The present disclosure generally relates to color management. In particular, the present disclosure relates to color management for a set of display devices. The technique may be embodied in one or more of devices, methods, and a data structure.

BACKGROUND

In modern life, users face more and more situations, in which they are surrounded by more than one display device. Reasons for that are, for example, decreasing costs of modern display devices, a tendency towards controlling devices via touchscreens, and the digitalization of modern life in general. For example, a driver or another passenger of a modern car may be surrounded by a set of display devices, wherein each display device of the set may be individually controllable by an associated control device. In this exemplary display environment, the individual display devices of the set of display devices may be used for presenting information to the driver (speed, navigation information, etc.), for providing an input interface for the driver or other passengers in order to communicate with a control device of the car, e.g., by using touch gestures (inputting navigation data, changing a radio station, etc.), and for providing media content to the driver and/or to other passengers of the car (e.g., photos, video, etc.). In this situation, more than one of the set of display devices may be visible for a user at the same time.

Hence, in order to provide a convenient color representation, it is desirable that the same object or similar objects displayed (e.g., simultaneously or successively) on at least two of the set of display devices is perceived similarly by the user. In other words, it is desirable that displayed physical color values of one and the same object (e.g., a user interface, UI, element) are the same or at least similar, independent from the display device they are displayed on.

In the prior art, graphic designers had to generate custom variants of each UI element for each display device used in the display environment, and thereby take into account the individual display properties of the display devices. However, this approach is complex and burdensome for the graphic designers and it uses a lot of memory space since versions of each UI element have to be stored for each display device. Further, in case a new display device is added to the set of display devices, a new variant of each UI element has to be generated for this new display device.

SUMMARY

In view of the above, there is a need for a technique of color management for a set of display devices, wherein the technique avoids one or more of the drawbacks discussed above or other related problems.

According to a first aspect, a display color management device is presented. The display color management device comprises a memory and a processor. Instructions are stored on the memory, which when carried out instruct the processor to access color profile data for each display device of a set of display devices. The color profile data is indicative of a relationship between digital color values input into a respective display device and associated physical color values displayed by the respective display device. Further, the color profile data is representative of a color gamut of the respective display device. The instructions further instruct the processor to determine, based on the color profile data, an overlap color gamut as an overlap of all color gamuts of the set of display devices. Further, the instructions instruct the processor to determine, based on the color profile data and based on the overlap color gamut, conversion information for each display device of the set of display devices. The conversion information is configured to convert an input digital color value to dedicated output digital color values for two or more of the display devices. The output digital color values are associated with substantially the same physical color inside the overlap color gamut.

The display color management device may be a device which not only determines the conversion information, but also uses this conversion information for outputting at least one of the dedicated output digital color values to at least one of the set of display devices. Additionally or alternatively, the determined conversion information may be stored in the memory of the display color management device and/or transmitted to a different device, which performs conversion of input digital color values, e.g., a display controller device.

The color profile data may comprise, e.g., a lookup table which maps input digital color values (e.g., in RGB format) to corresponding physical color values (e.g., in CIE xyY color space format). The color profile data may further comprise a matrix (e.g., a 3×3 matrix). In that case, an input color value vector, e.g., an (R,G,B) vector, may be multiplied with this matrix in order to obtain a vector of associated physical color values, e.g., an (Y,x,y) vector.

Further, the color profile data is representative of a color gamut of the respective display device. For example, in case the color profile data comprises a lookup table, the color gamut may be determined by considering the physical color values indicated in the lookup table. The color gamut may be interpolated from these individual data points. In case the color profile data comprises a matrix, the color gamut may be represented by the maximum set of physical color values that can be obtained from the respective matrix multiplication. Further, the color gamut of the respective display device may be explicitly indicated in the color profile data by a separate dataset.

The overlap color gamut may be representative of a subset of physical color values that can be physically displayed by all display devices of the set of display devices. The color gamuts of the display devices as well as the overlap color gamut may be represented, e.g., by an area or a volume in the CIE xyY color space, in the CIE 1931 XYZ color space, in the Lab color space, or any other appropriate color space.

The conversion information may comprise a matrix (e.g., a 3×3 matrix) wherein an input (R,G,B) vector may be transformed to an output (R',G',B') vector of dedicated output digital color values by multiplying the input vector with the matrix. Further, the conversion information may comprise a lookup table, which maps input digital color values to dedicated output digital color values. In that case, a proper interpolation may be used for input digital color values that are not represented by the lookup table.

The expression "substantially the same physical color" does not necessarily mean that the output physical color of two different display devices for the same input digital color value has to be exactly the same, but rather that the physical colors output by the two or more display devices are perceived as the same color or at least as similar colors by a user. For example, this could mean that a luminance or lightness value of the two or more physical colors is different from each other, but chromaticity values of the two colors are the same or at least very close to each other. A measure for determining the similarity of two physical color values is the color difference, which can be expressed, e.g., by a value Delta E ($\Delta E^*_{ab}$, also called $\Delta E^*$, dE*, dE, or "Delta E"). As an example, the expression "substantially the same physical color" may mean that the color difference Delta E between the two physical color values is below a certain amount. This certain amount may be 2 in the CIE L*a*b* color space. Further, this certain amount may be 1 in the CIE L*a*b* color space. Still further, this certain amount may be 0.5 in the CIE L*a*b* color space. The color difference value for different color spaces may be converted by known transformations.

The display color management device may further comprise a color value output interface configured to output the dedicated output digital color values to the two or more of the display devices. The instructions when carried out may further instruct the processor to obtain the input digital color value, access the conversion information, convert, based on the conversion information, the input digital color value to the dedicated output digital color values, and transmit the dedicated output digital color values to the two or more of the display devices via the color value output interface.

The color value output interface may be any suitable interface for providing the dedicated output digital color values to at least two of the display devices. For example, the color value output interface may comprise an interface configured to output picture data or video data by using any kind of suitable format for the respective display devices. For example, the dedicated output digital color values may be represented by RGB values and in particular by 24 bit RGB values, wherein an 8 bit value is assigned to each one of the three color channels. The input digital color value may be obtained, e.g., from the memory of the display color management device or from an external device providing picture data or video data to the display color management device. The conversion information may be stored on the memory of the display color management device and may be accessed from there. The expression "convert, based on the conversion information" may mean that a conversion function is carried out, wherein at least one input value (e.g., the input digital color value) is converted to at least one output value (e.g., the dedicated output digital color values). For the conversion, the conversion information is used, such that the conversion information defines how the conversion is carried out, e.g., by suitable parameters. As a concrete example, the conversion information may comprise a conversion matrix (e.g., a 3×3 matrix C), wherein the conversion is carried out by multiplying an input (R,G,B) vector with this matrix C in order to obtain an output vector (Y,x,y).

The display color management device may further comprise a conversion information output interface configured to output the conversion information for at least one of the set of display devices. Further, the display color management device may comprise an overlap color gamut output interface configured to output information representative of the overlap color gamut.

The conversion information output interface and/or the overlap color gamut output interface may be, e.g., data interfaces, via which respective data may be output to an external device. The output information representative of the overlap color gamut may be representative of an area or a volume in the CIE xyY color space, in the CIE 1931 XYZ color space, in the Lab color space, or in any other appropriate color space.

The display color management device may further comprise a color profile data input interface configured to receive the color profile data for at least one of the set of display devices from the respective display device. For example, the color profile data input interface may be configured to receive data representing at least one lookup table from the at least one of the respective display devices, e.g., via a suitable data connection.

The instructions when carried out may instruct the processor to access the color profile data for at least one of the set of display devices by accessing a data structure stored on the memory of the display color management device. For example, the color profile data for the at least one of the set of display devices may be stored in a database (e.g., comprising a plurality of lookup tables or matrices for each display device) in the memory. The data structure may comprise color profile data for a plurality of display devices, wherein this color profile data may be accessed when the set of display devices comprises one of the plurality of display devices, for which color profile data is stored. In case the set of display devices comprises a display device, for which no color profile data is stored in the data structure, the color profile data for this display device may be retrieved via an input interface or it may be manually input into the display color management device. Further, a standard color profile may be used for such a display device, for which no color profile data is stored in the data structure.

The display color management device may further comprise a display identification input interface configured to receive a display identification from at least one of the set of display devices, wherein the color profile data for the at least one of the set of display devices is accessed based on the display identification information.

The display identification information may be unique for each display model of each display manufacturer, such that a certain type of display model may be identified by a unique display identification information. In the data structure, color profile data for each display device (e.g., in the form of a lookup table) may be stored together with display identification information, such that for each type of display, the corresponding color profile data may be accessed from the data structure.

The display color management device may further comprise an age information input interface configured to receive an age information from at least one of the set of display devices, wherein an age value indicative of an age of the respective display device is derivable from the age information. The age information input interface may be any suitable data input interface configured to receive the age information. The age information may be stored in the memory of the display device, from which it is received. For example, the age information may correspond to the age value. The age value may indicate the age of the respective display device, e.g., in days or in years. The age of the display device may be measured, e.g., beginning from its production, from its installation, or from its commissioning.

Further, the age value may indicate the hours of operation of the respective display device.

The conversion information may be configured to compensate for an expected change of the color gamut of the respective display device due to aging. For this, an age value may be determined, which is representative of an age (e.g., in days or years) of a corresponding one of the set of display devices. For example, the age value may be determined based on age information received from one of the set of display devices. The conversion information may comprise a function, which takes account of this aging value, such that the dedicated output digital color values depend on the age value of the corresponding display device.

The display color management device may further comprise a user interface configured to receive user input for choosing individual display devices for determining the set of display devices and a simulation color value output interface configured to output a test image to a simulation display device. The simulation display device is a display device of the set of display devices. The instructions when carried out may further instruct the processor to obtain a plurality of input digital color values for the test image, access the conversion information for the simulation display device, convert, based on the conversion information for the simulation display device, the plurality of input digital color values for the test image to dedicated output digital color values, and transmit the dedicated output digital color values to the simulation display device via the simulation color value output interface for displaying the test image on the simulation display device.

The set of display devices may be determined, e.g., by choosing display devices for the set of display devices by their corresponding manufacturers and/or model numbers. However, the simulation display device may be a predetermined part of the set of display devices and does not have to be explicitly selected by a user. The color profile data for the simulation display device may be received from the simulation display device or stored in a memory of the display color management device. The plurality of input digital color values for the test image may comprise a wide range of different color values. For example, the plurality of input digital color values for the test image may be selected from the entire 24 bit RGB range, such that the plurality of input digital color values comprises a plurality of values lying on an edge of a digital input RGB color space. For example, a "rainbow" or a CIE chromaticity diagram may be displayed. Alternatively or additionally, a user interface or a photograph may be displayed in the test image. The dedicated output digital color values may be transmitted to the simulation display device such that an image is displayed on the simulation display device, which comprises substantially only physical colors within the overlap color gamut.

According to a second aspect, a display controller device is presented. The display controller device comprises a memory, a processor, and a color value output interface configured to output dedicated output digital color values to two or more of a set of display devices. Instructions are stored on the memory, which when carried out instruct the processor to obtain an input digital color value, access conversion information, wherein the conversion information is configured to convert the input digital color value to dedicated output digital color values for the two or more of the display devices, wherein the output digital color values are associated with substantially the same physical color inside an overlap color gamut of the color gamuts of the two or more of the display devices, convert, based on the conversion information, the input digital color value to the dedicated output digital color values for the two or more of the set of display devices, and transmit the dedicated output digital color values to the two or more of the set of display devices via the color value output interface.

The display controller device may be, e.g., a display controller for controlling at least two display devices of the set of display devices by providing a suitable video signal to each of the controlled display devices. The input digital color value may be obtained from an external device or may be generated by the display controller device itself, for example. The conversion information may be stored on the memory of the display controller device. For example, this conversion information may have been previously determined by a display color management device described herein.

According to a third aspect, a motor vehicle comprising the display controller device according to this disclosure is presented. The motor vehicle may be, e.g., a passenger car having a plurality of displays configured to display information to the driver or other passengers of the vehicle. The entire set of the plurality of displays or a subset of the plurality of displays of the vehicle may form the set of display devices described herein. The display controller device may be part of a general controller device of the vehicle.

According to a fourth aspect, a display color management method is presented. The display color management method comprises the step of accessing color profile data for each display device of a set of display devices. The color profile data is indicative of a relationship between digital color values input into a respective display device and associated physical color values displayed by the respective display device. Further, the color profile data is representative of a color gamut of the respective display device. The display color management method further comprises the step of determining, based on the color profile data, an overlap color gamut as an overlap of all color gamuts of the set of display devices. Further, the color management method comprises the step of determining, based on the color profile data and based on the overlap color gamut, conversion information for each display device of the set of display devices. The conversion information is configured to convert an input digital color value to dedicated output digital color values for two or more of the display devices. The output digital color values are associated with substantially the same physical color inside the overlap color gamut.

The display color management method may be carried out, e.g., by a display color management device described herein and in particular by a processor of a display color management device described herein.

The display color management method may further comprise the steps of obtaining the input digital color value, accessing the conversion information, converting, based on the conversion information, the input digital color value to the dedicated output digital color values, and transmitting the dedicated output digital color values to the two or more of the display devices.

The display color management method may further comprise the step of outputting the conversion information for at least one of the set of display devices. The display color management method may further comprise the step of outputting information representative of the overlap color gamut.

The display color management method may further comprise the step of receiving the color profile data for at least one of the set of display devices from the respective display device.

Accessing the color profile data for at least one of the set of display devices may comprise accessing a data structure stored on the memory of the display color management device.

The display color management method may further comprise the step of receiving a display identification from at least one of the set of display devices. The color profile data for the at least one of the set of display devices may be accessed based on the display identification information.

The display color management method may further comprise the step of receiving an age information from at least one of the set of display devices, wherein an age value indicative of an age of the respective display device is derivable from the age information.

The conversion information may be configured to compensate for an expected change of the color gamut of the respective display device due to aging.

The display color management method may further comprise the steps of receiving user input for choosing individual display devices for determining the set of display devices, obtaining a plurality of input digital color values for a test image to be displayed on a simulation display device, wherein the simulation display device is a display device of the set of display devices, accessing the conversion information for the simulation display device, converting the plurality of input digital color values for the test image to dedicated output digital color values by using the conversion information for the simulation display device, and transmitting the dedicated output digital color values to a simulation display device for displaying the test image on the simulation display device.

According to a fifth aspect, a display control method is presented. The display control method comprises the step of obtaining an input digital color value and accessing conversion information. The conversion information is configured to convert the input digital color value to dedicated output digital color values for two or more of a set of display devices. The output digital color values are associated with substantially the same physical color inside an overlap color gamut of the color gamuts of the two or more of the display devices. The display control method further comprises the steps of converting, based on the conversion information, the input digital color value to the dedicated output digital color values for the two or more of the set of display devices and transmitting the dedicated output digital color values to the two or more of the set of display devices.

According to a sixth aspect, a data structure representing conversion information for a set of display devices each having a respective color gamut is presented. The conversion information is configured to convert an input digital color value to dedicated output digital color values for two or more of the display devices. The output digital color values are associated with substantially the same physical color inside an overlap color gamut of the color gamuts of the two or more of the set of display devices.

The data structure may be stored, e.g., on a volatile or non-volatile storage medium. The data structure may be readable by a display controller device in order to carry out a display control method as described herein.

BRIEF DESCRIPTION OF THE DRAWINGS

Embodiments of the technique presented herein are described below with reference to the accompanying drawings, in which:

FIGS. 6a and 6b each show color profile data in the form of a lookup table for a corresponding display device;

FIG. 9 shows an exemplary calculation rule for determining the conversion information for a display device;

FIG. 10 shows how the conversion information for the exemplary display device A of FIGS. 7 and 8 may be determined by using the calculation rule of FIG. 9;

DETAILED DESCRIPTION

FIG. 1 shows a block diagram of a display color management device 2 in accordance with the present disclosure. The display color management device 2 comprises a memory 4 and a processor 6, wherein the memory 4 and the processor 6 are logically connected such that the processor 6 is configured to perform a method based on instructions stored in the memory 4. As described with regard to the embodiments shown in FIGS. 11 to 13 of the present disclosure, the display color management device 2 can further comprise a plurality of input and/or output interfaces, which are not shown in FIG. 1. The memory 4 may comprise a volatile and/or a non-volatile memory and may comprise, e.g., one or more of an HDD, SDD, RAM, ROM, magnetic storage device, solid state storage device, and optical storage device. The processor 6 may comprise, e.g., one single CPU or a plurality of processors configured to perform the method according to the instructions stored on the memory 4. The memory 4 and the processor 6 are not necessarily physically located on one and the same device but may be distributed over a plurality of devices and logically connected by respective data interfaces. Further, the display color management device 2 may be realized by a cloud computing device.

On the memory 4 instructions are stored, which when carried out instruct the processor 6 to perform the following steps:

access color profile data for each display device of a set of display devices, wherein the color profile data is indicative of a relationship between digital color values input into a respective display device and associated physical color values displayed by the respective display device, and wherein the color profile data is representative of a color gamut of the respective display device;

determine, based on the color profile data, an overlap color gamut as an overlap of all color gamuts of the set of display devices;

determine, based on the color profile data and based on the overlap color gamut, conversion information for each display device of the set of display devices, wherein the conversion information is configured to convert an input digital color value to dedicated output digital color values for two or more of the display devices, wherein the output digital color values are associated with substantially the same physical color inside the overlap color gamut.

The display color management device 2 is therefore configured to carry out a display color management method according to the present disclosure.

Figure 1A:
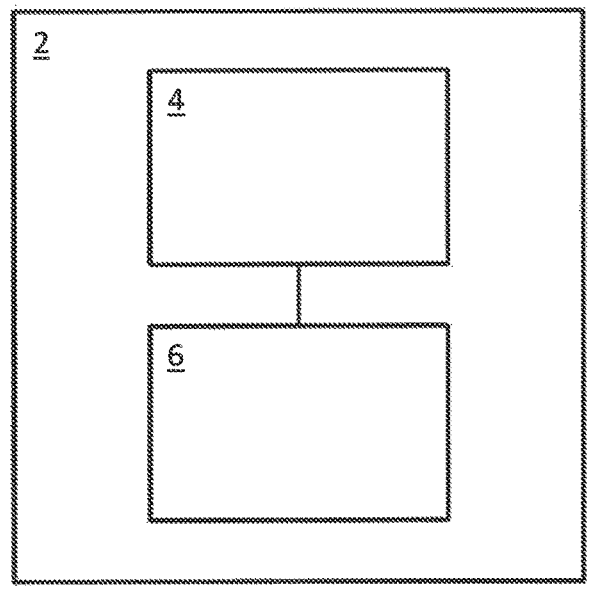
FIG. 1a is shows a schematic block diagram of a display color management device in accordance with an aspect of this disclosure.
Figure 1B:
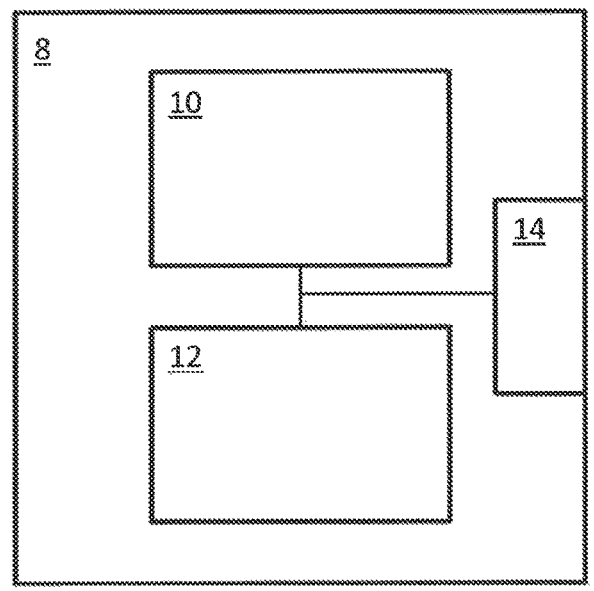
FIG. 1b shows a schematic block diagram of a display controller device in accordance with an aspect of this disclosure.

FIG. 1b shows a block diagram of a display controller device 8 according to the present disclosure. The display controller device 8 comprises a memory 10 and a processor 12, wherein the remarks made above with regard to the memory 4 and the processor 6 of the display color management device 2 also apply to the memory 10 and the processor 12 of the display controller device 8. The display controller device 8 further comprises a color value output interface 14 configured to output dedicated output digital color values to two or more of a set of display devices. The color value output interface 14 may consist of one single color value output interface (as shown in FIG. 1b for the sake of simplicity) or may comprise a plurality of color value output interfaces 14, wherein one color value output interface 14 is provided for each display device that is controlled by the display controller device 8. The color value output interface 14 is configured to output different output digital color values to different display devices.

Instructions are stored on the memory 10, which when carried out instruct the processor 12 to perform the following steps:

obtain an input digital color value;

access conversion information, wherein the conversion information is configured to convert the input digital color value to dedicate output digital color values for the two or more of the display devices, wherein the output digital color values are associated with substantially the same physical color inside an overlap color gamut of the color gamuts of the two or more of the display devices;

convert, based on the conversion information, the input digital color value to the dedicated output digital color values for the two or more of the set of display devices; and transmit the dedicated output digital color values to the two or more of the set of display devices via the color value output interface.

Therefore, the display controller device 8 is configured to perform a display control method according to the present disclosure.

As described above, the display color management device 2 determines conversion information for each display device of the set of display devices, wherein the display controller device 8 uses this conversion information for converting input digital color values to dedicated output digital color values, which are output via the color value output interface 14. As shown in FIGS. 1a and 1b, the display color management device 2 and the display controller device 8 may be separate devices having their own memories 4 and 10 and their own processors 6 and 12, respectively. However, the display color management device 2 and the display controller device 8 may also be represented by one and the same device, wherein one memory fulfills the functions of memory 4 and 10 and wherein one processor fulfills the functions of processor 6 and 12. Examples of such embodiments, in which the display color management device 2 and the display controller device 8 are one and the same device or are separate devices will be described later on with reference to FIGS. 11 to 13.

In view of the above, it should be noted that the display color management device 2 and the display controller device 8 are not necessarily one and the same device, but rather that the display color management device determines information, which is then used by the display controller device 8, such that the two devices 2 and 8 are interrelated products.

Figure 2:
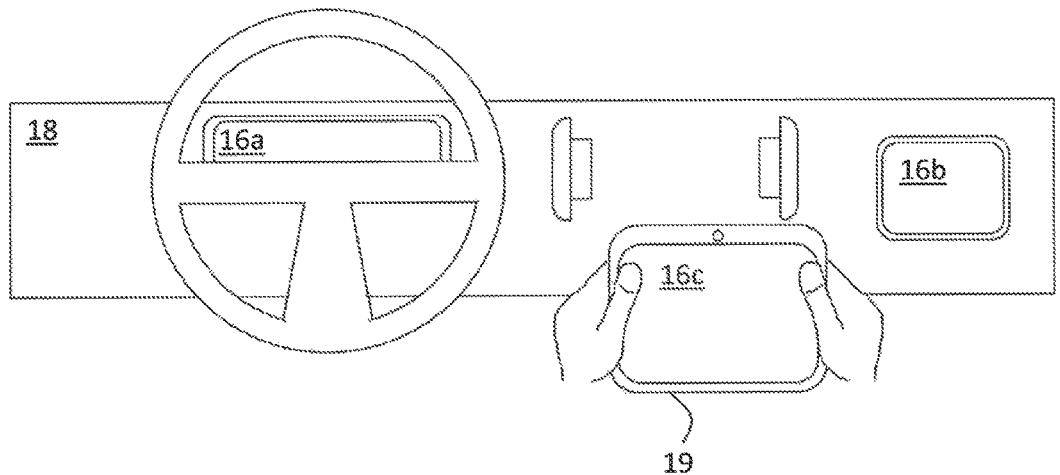
FIG. 2 shows a schematic representation of a display environment, in which a set of display devices is visible to a user.

FIG. 2 shows a display environment, in which a plurality of display devices 16a, 16b, and 16c are visible to a user, e.g., at the same time. The example of FIG. 2 shows the cockpit of a car, in which the display devices 16a and 16b are fixed to the dashboard 18 of the car. Further, the display device 16c is an "external" display device of a mobile tablet computer 19, wherein the tablet computer 19 may be used for controlling certain functionalities of the car or for watching media content, such as pictures or video. In line with the definition given in the present disclosure, the display devices 16a, 16b, and 16c (generally referred to by reference numeral 16) belong to a set of display devices 16, for which it is desirable that one and the same object displayed on all display devices 16 shall be perceived by the user as having the same color values. For example, a video simultaneously displayed on the display device 16c of the mobile smart display 19 and on the fixed display device 16b should be displayed in the same or in almost the same physical colors on both display devices 16. As another example, UI elements (user interface elements), such as icons or visual indicators should be displayed on all display devices 16a, 16b, and 16c in the same or almost the same physical color values.

Such uniformity of color representation is desirable from a designer's point of view in order to provide a pleasant experience for the user. Further, it is easier for the user, e.g., to navigate through menu structures, when menu items have the same color on every display device 16a, 16b, and 16c of the set of display devices.

It should be appreciated, that there are several situations, besides the one shown in FIG. 2, in which it is desirable to achieve a uniform color impression between a plurality of display devices 16. In particular, the present technique is also useful, e.g., in the context of any other situation in which the same object (or similar objects) or video shall be displayed on a plurality of display devices 16, or in which matching colors shall be achieved for any other reasons.

Figure 3:
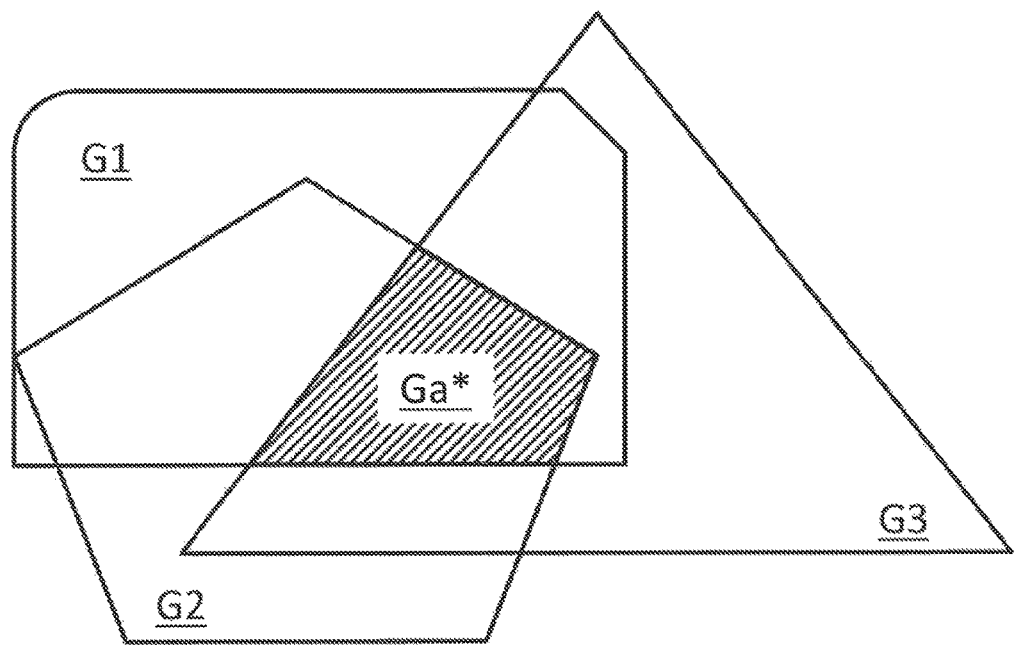
FIG. 3 shows a schematic representation of three color gamuts of a set of display devices comprising three display devices, wherein an overlap color gamut is also indicated in the figure.

FIG. 3 shows a two-dimensional representation of three different color gamuts G1, G2, and G3. For example, the color gamut G1 may be associated with the display device 16a of FIG. 2, the color gamut G2 may be associated with the display device 16b of FIG. 2 and the color gamut G3 may be associated with the display device 16c of FIG. 2. The representation in FIG. 3 may correspond, e.g., to a representation in the CIE xyY color space, wherein a horizontal axis represents the x-value of the color space and the vertical axis represents the y-value of the color space. Hence, the representation of FIG. 3 indicates color gamuts with regard to chromaticity values that can be physically displayed by the respective display devices 16. A two-dimensional representation of color gamuts of different display devices as shown in FIG. 3 is common in the art. However, also a three-dimensional color gamut extending also in the lightness-direction (e.g., the Y-direction) of the color space may be used.

The person skilled in the art will appreciate that there are several possibilities of color representation in different color spaces. For example, the color gamuts G1, G2, and G3 may also be a representation in the Lab color space (CIELAB), in which an L* value represents the lightness of a color and a* and b* values represent the chromaticity of a certain color. In that case, the representation of FIG. 3 is in the a*-b* plane of the color space. Another example for a color space that may be used is the CIE 1976 (L*,u*,v*) color space (CIELUV). Between these color spaces, clear conversion rules exist, such that a skilled person can easily convert physical color values from one color space into another color space.

As shown in FIG. 3 different display devices may be physically able to display different ranges of colors (so-called color gamuts) in a chromaticity plane of a considered color space. The physical colors that may be displayed by a particular display device may be limited by the quality and the amount of used pixel colors for generating a color impression of the respective display device. For example, in case the considered display device has pixels for displaying a red, green, and blue color, respectively, the resulting color gamut may be triangular (for a particular luminance value) as indicated by the color gamut G3 in FIG. 3. In that case, all colors, i.e., all chromaticity values inside the respective shape of the color gamut are physically displayable by the display device 16.

The color gamut of a considered display device strongly depends on a quality of the display device and/or on the used technique (amount of pixel colors, LCD/CRT/OLED, etc.). As indicated in FIG. 3, in case the color gamuts G1, G2, and G3 of a certain set of display devices 16a, 16b and 16c is considered, there will be a certain overlap color gamut Ga* of physical color values that are displayable by all display devices 16 of the set of display devices 16. Therefore, in order to achieve a uniform color representation on all of these display devices 16, only physical colors inside this overlap color gamut Ga* should be displayed.

Figure 4:
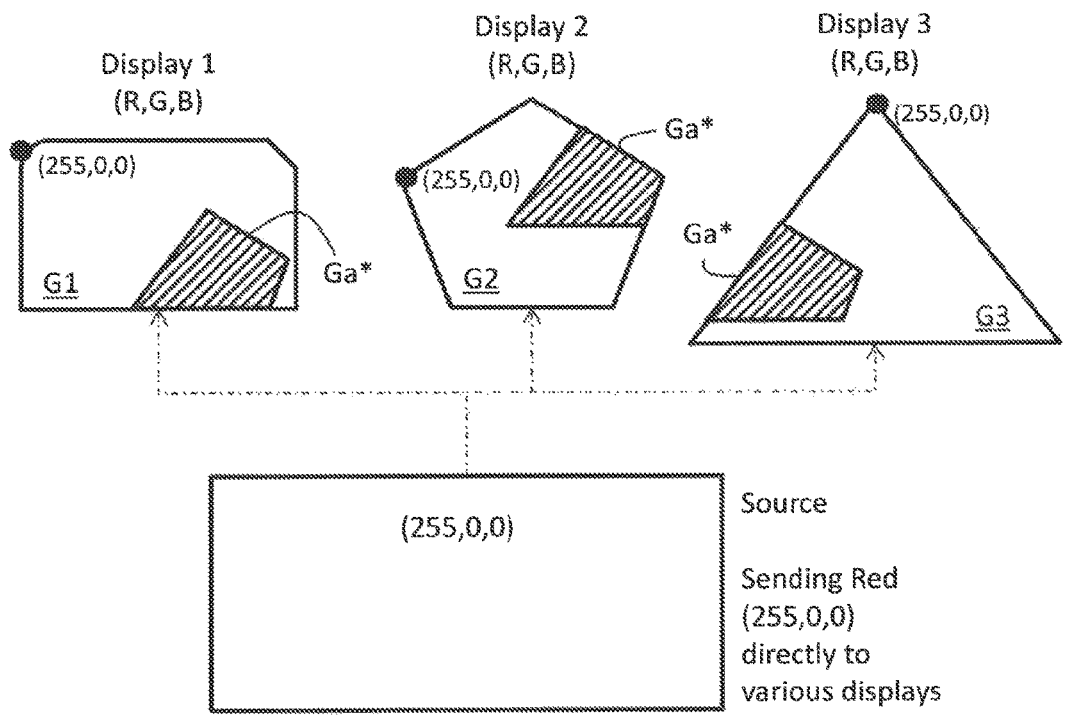
FIG. 4 shows a situation, in which an exemplary digital color value is input into three different display devices of a set of display devices without using the color management technique described herein.

FIG. 4 shows the situation in case of no display color management, when one particular (R,G,B) digital color value ((255,0,0) in the example of FIG. 4) is sent to each one of the display devices 16, e.g., one of the display devices 16a, 16b, and 16c shown in FIG. 2. Again, these display devices 16 respectively have the color gamuts G1, G2, and G3. In FIG. 4, the dash-dotted line represents the digital (R,G,B) value sent to the different display devices 16. As indicated by a solid black circle, the (R,G,B) value of pure red (255,0,0) leads to a physical color representation in the upper left corner of the color gamut G1 of the first display device 16a. Further, the same digital color value (255,0,0) leads to different physical color representation on the second display 16b and the third display 16c, as it is obvious by comparing the position of the black solid circles in FIG. 4 in view of the representation of FIG. 3. Therefore, if no display color management is used, the same digital color values will lead to different physical color representations in the different display devices 16 of the set of display devices 16.

Figure 5:
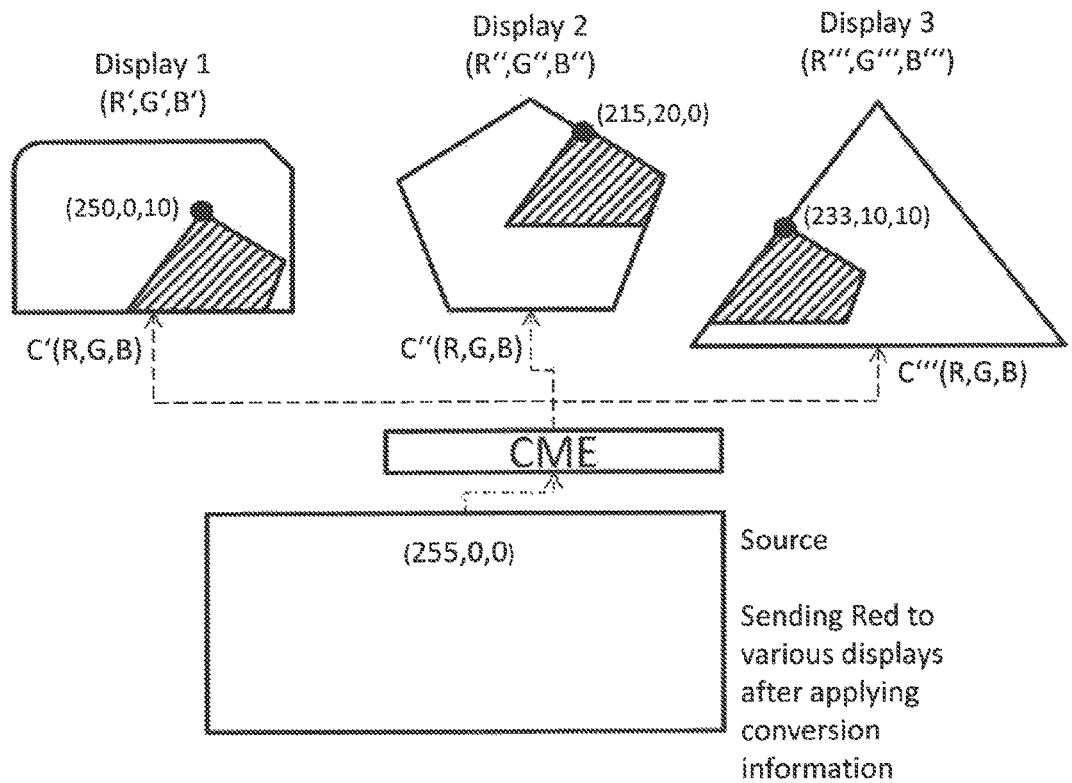
FIG. 5 shows a situation in which the digital color value of FIG. 4 is transformed by a color management technique described herein and dedicated output digital color values are transmitted to three different display devices of a set of display devices.

FIG. 5 shows a representation similar to that of FIG. 4. However, in FIG. 5 the digital color output values are processed by a display color management technique according to the present disclosure (see color management engine CME in FIG. 5). The color management engine CME in FIG. 5 may correspond to a display controller device 8 according to the present disclosure. As can be seen in FIG. 5, the color management engine converts the input digital color value (255,0,0) to associated physical color values for each display device 16a, 16b, and 16c of the set of display devices. As indicated in FIG. 5, the color management engine converts the digital color value (255,0,0) to the dedicated output digital color value (250,0,10) for the first display device 16a, (215,20,0) for the second display device 16b, and (233,10,10) for the third display device 16c. As indicated by FIG. 5 (compare with the representation in FIG. 3), the conversion of the color management engine leads to dedicated output digital color values that are associated with substantially the same physical color inside the overlap color gamut Ga*. In other words, the same color is displayed by all display devices 16 of the set of display devices 16 for the same input digital color value (R,G,B).

FIGS. 6a and 6b each show an example of a lookup table 20a and 20b for a respective display device 16 of the set of display devices 16. For example, the lookup table 20a shown in FIG. 6a may represent a lookup table for the first display device 16a shown in FIG. 2 and the lookup table 20b shown in FIG. 6b may represent a lookup table for the second display device 16b shown in FIG. 2. The lookup tables 20a and 20b of FIGS. 6a and 6b are examples for color profile data according to the present disclosure. The left three columns of each lookup table 20a, 20b represent digital color values (R,G,B) whereas the right three columns of each lookup table represent corresponding physical color values (Y,x,y) that are displayed by the respective display device 16 when the corresponding digital color value is input into the display device. In the exemplary lookup tables 20a and 20b, the digital color values (R,G,B) increment by 10, such that not every digital color of the 24 bit color space is represented in the lookup tables 20a and 20b. For information regarding digital color values, that are not represented in the lookup table 20, a suitable interpolation may be used. The corresponding physical color values (Y,x,y) may have been determined by a calibration process, in which each of the digital color values indicated in the lookup table is provided to the respective display device 16 and the associated physical color is measured by a color measuring device and written into the lookup table 20. The color measuring device may be a device measuring physical color and outputting values in the CIE xyY color space.

As will be discussed later in more detail, the lookup tables 20a and 20b for the display devices 16 of the set of display devices 16 may be stored, e.g., in a memory of the corresponding display device 16 or in a data base of a control device. Further, the lookup tables 20a, 20b or any kind of color profile data may be stored on any other known type of internal or external memory.

Additionally to the lookup tables shown in FIGS. 6a and 6b, the color profile data may comprise data explicitly indicating a color gamut of the corresponding display device 16. For example, such color gamut data may be representative of a shape in the x-y plane of the CIE xyY color space. Further, lightness-dependent color gamut data may be provided, such that for different lightness values Y or ranges of lightness values Y, different chromaticity gamuts are indicated in the x-y plane.

In case no explicit color gamut data is provided, such color gamut data may be extracted from the physical color values indicated in the lookup table. In that case, a color gamut of the respective display device may be an area in the x-y plane, which comprises all x-y data points indicated in the corresponding lookup table. In other words, the color gamut of the display device is determined based on the physical color values given by the color profile data for the corresponding display device 16. Further, individual color gamuts may be determined for different lightness (or luminance) values Y or ranges of lightness values Y. Thus, the used color gamut may be a color gamut for a particular predetermined standard luminance value (e.g., Y in the xyY color space). Further, a three-dimensional color gamut in the Y-x-y space may be determined.

The person skilled in the art will appreciate that, besides the CIE xyY color space, any other type of color space may be used for carrying out the present invention, such as the CIELAB color space or the CIE 1931 XYZ color space, for example. Points in these color spaces may be easily transformed to another color space by known transformation functions.

Further, as an alternative to the lookup tables 20a and 20b indicated in FIGS. 6a and 6b, respectively, 3×3 matrices may be used as color profile data for the display devices 16. 3×3 matrices comprise less information than the lookup tables 20a, 20b, but allow a direct and unambiguous mapping of digital color values to associated physical color values by a simple matrix multiplication. In that case, an (R,G,B) vector is multiplied with the 3×3-matrix to obtain an (Y,x,y) vector of physical color values. The color gamut may be determined in that case by considering the set of possible physical color values vectors (Y,x,y) obtainable by the matrix multiplication, e.g., by inputting (R,G,B) input vectors from the entire three-dimensional 24 bit (or any other appropriate bit number) RGB space.

FIGS. 7, 8, 9, and 10 show an exemplary way of determining conversion information in the form of conversion matrices C for two exemplary display devices A and B each having a triangular color gamut GaA and GaB, respectively.

Figure 7:
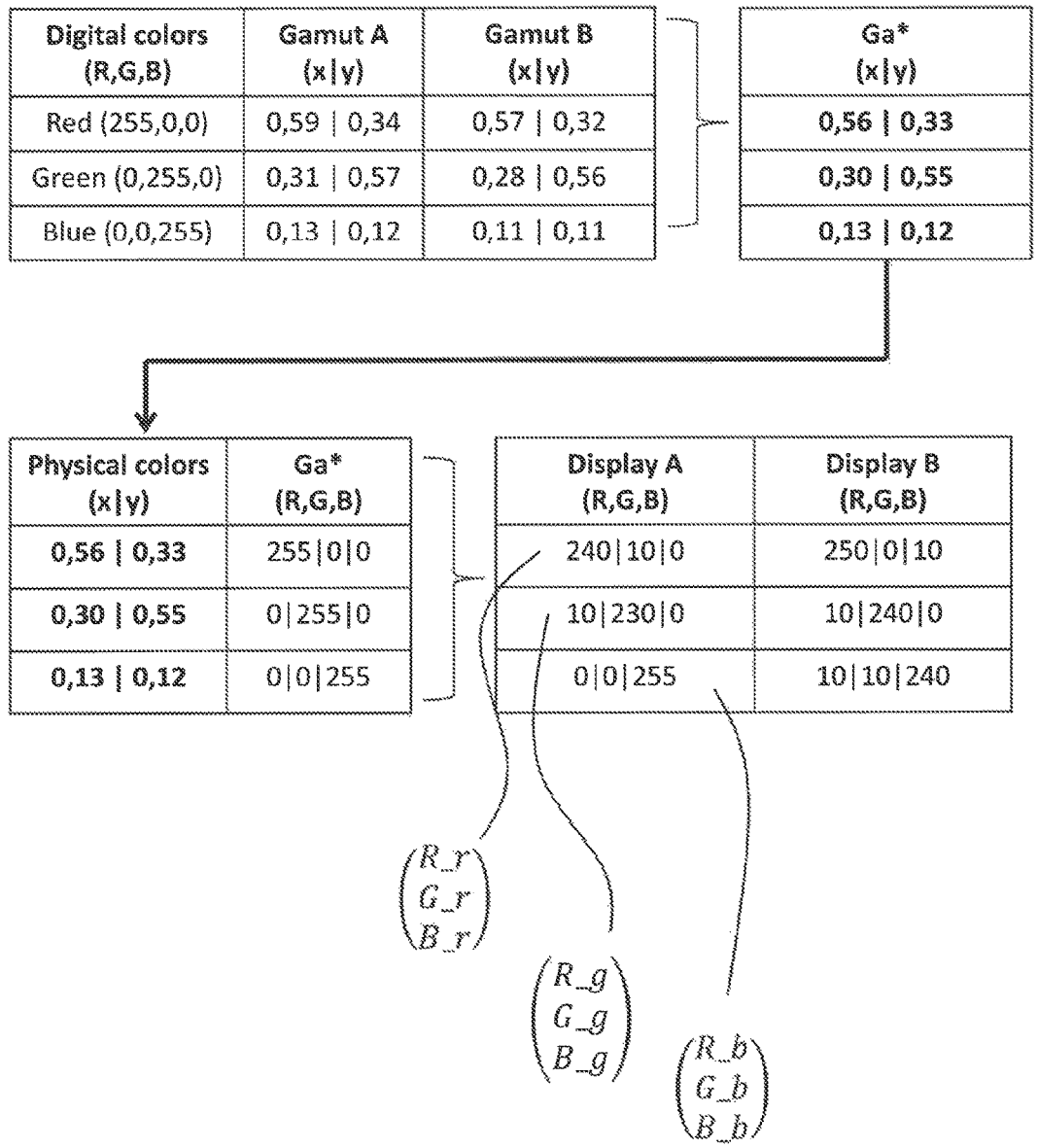
FIG. 7 shows an example for a process of determining an overlap color gamut for two exemplary display devices A and B.

In the upper left table of FIG. 7, it is indicated, which chromaticity values x and y (in the CIE xyY color space) are displayed by the display device A and B, respectively, in case that digital input color values for the three basic colors red (255,0,0), green (0,255,0), and blue (0,0,255), respectively, are input in the respective display device. For example, if green (0,255,0) is input into display device B, the color (0.28,0.56) is displayed in the x-y plane. These values are determined from the respective color profile information (e.g., lookup tables) of the corresponding display devices A and B. The three physical color values for each display device represent three corners of a triangular color gamut GaA and GaB for the corresponding display device, see FIG. 8.

Figure 8:
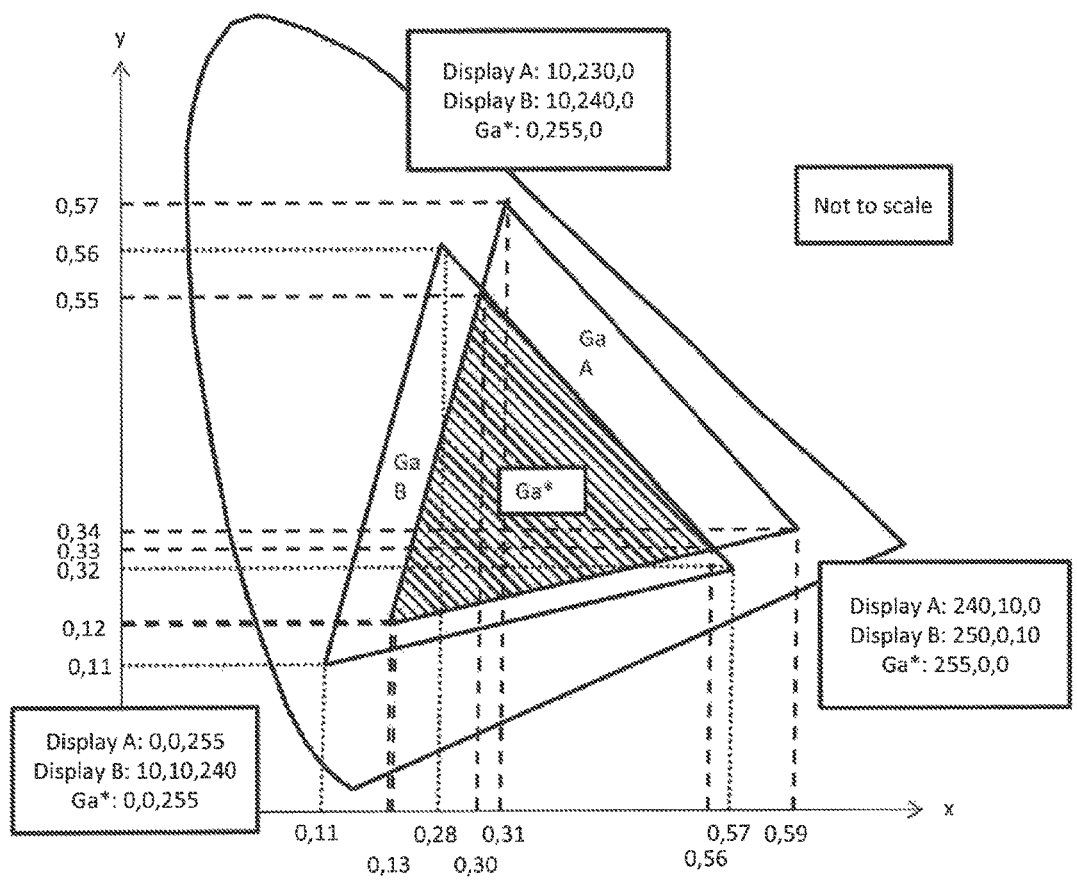
FIG. 8 shows a representation of the color gamuts of the exemplary display devices A and B of FIG. 7.

FIG. 8 shows the color gamuts of displays A and B in the x-y plane of the CIE xyY color space. The corner values for the color gamuts GaA and GaB correspond to those indicated in the upper left table of FIG. 7. Based on the determined color gamuts GaA and GaB, the overlap color gamut Ga* may be determined, for example by using a simple geometrical analysis in the x-y plane. In case a color gamut in scale is used, the corner values for Ga* may be, e.g., simply read from the x-axis and the y-axis. Further, simple math may be used to determine these corner values of the overlap color gamut Ga* as will be immediately understood by those skilled in the art. The overlap color gamut Ga* and its corner values are also indicated in FIG. 8.

The corner values of the triangular overlap color gamut Ga* of display devices A and B is indicated in the upper right table of FIG. 7. These values correspond to those indicated in the left column of the lower left table of FIG. 7, in which the corresponding digital color values (R,G,B) are indicated, which shall be transferred to the corner values of the overlap color gamut Ga*. For example, the digital value (255,0,0) for green shall be mapped to the value (0.56,0.33) in the physical x-y color space.

From the color profile information (e.g., the lookup tables), it can now be determined for each display device A and B, which digital input color values (R,G,B) most closely represent the physical x-y values of the overlap color Gamut Ga*. These values for display A and B are indicated in the lower right table on FIG. 7. For example, in order to generate a color close or identical to (0.30,0.55), the input color value (10,240,0) has to be input into display B.

FIG. 9 shows how the conversion matrix C may be determined for a display device (e.g., display device A or B) based on the information derived according to the above method. Each line of FIG. 9 represents a simple matrix multiplication, and, therefore, a linear system of equations. As shown in FIG. 9, a conversion matrix C has nine entries a_11 to a_33. By using the known values determined with regard to FIG. 7, the linear system of equations may be solved and the values for a_11 to a_33 may be determined as shown in FIG. 9.

In order to determine the individual entries a_11 to a_33 of the conversion matrix C, the basic digital color values for red, green, and blue may be used. As shown in the first three lines of FIG. 9, by using the known values of the lower right matrix of FIG. 7 for the vectors (R_r,G_r,B_r), (R_g,G_g, G_g), and (R_b,G_b,G_b), the values for a_11 to a_33 may be determined by solving the linear systems of equations. From the first line of FIG. 9, the values for a_11, a_21, and a_31 can be determined, from the second line of FIG. 9, the values for a_12, a_22, and a_32 can be determined, etc.

As an optional step, an equation for the white point may be used. By using an equation for the white point, the determined values a_11 to a_33 of the matrix C can be checked and it can also be decided to rather use values for some of the entries a_11 to a_33 based on the equation for the white point. Further, a mean value may be determined between values determined for red, green, and blue, and values determined for the white point. In line five of FIG. 9, the complete conversion matrix C is displayed.

FIG. 10 shows an example, in which the conversion matrix $C_A$ is calculated for the exemplary display device A according to the calculation method described with regard to FIG. 9. In line four of FIG. 10, the complete conversion matrix $C_A$ for display device A is indicated.

Besides the method described above, there are many possible ways of determining conversion matrices or other conversion information (e.g., lookup tables) based on color profile data and based on the overlap color gamut Ga*. It should further be noted that the above method may be extended to any other number of display devices larger than two, simply by considering the overlap color gamut Ga* as a color gamut of a first display device (display device A in the above example) and the color gamut of a further display device as color gamut for the second display device (display device B in the above example).

As will be appreciated by the skilled person, the method described above (or any other suitable method for determining conversion matrixes) does not necessarily always lead to physical color output values of the two or more considered display devices, due to the limited number of displayable colors of each display device. Therefore, it is desirable to find physical color values that match as closely as possible and, as explained above, which have a color difference Delta E as small as possible.

Further, it should also be appreciated that it cannot always be assured that, after applying the conversion, all possible output physical colors of each display device entirely lie inside the overlap color gamut. There may be situations, in which it is necessary to map a digital input color value to a digital output color value, which leads to the display of a physical color not inside the overlap color gamut Ga* but closely to the edge of the overlap color gamut Ga*. Also in this situation, it is desirable that a color difference Delta E between the edge of the overlap color gamut Ga* and this color is as small as possible. In view of the above, "inside the overlap color gamut" according to the present disclosure has to be understood in a way that it is desired to only display physical colors inside the overlap color gamut Ga*. However, due to the limitations of the used conversion information, also color values close to the edge of the overlap color gamut Ga* should be considered to represent colors "inside the overlap color gamut".

Figure 11:
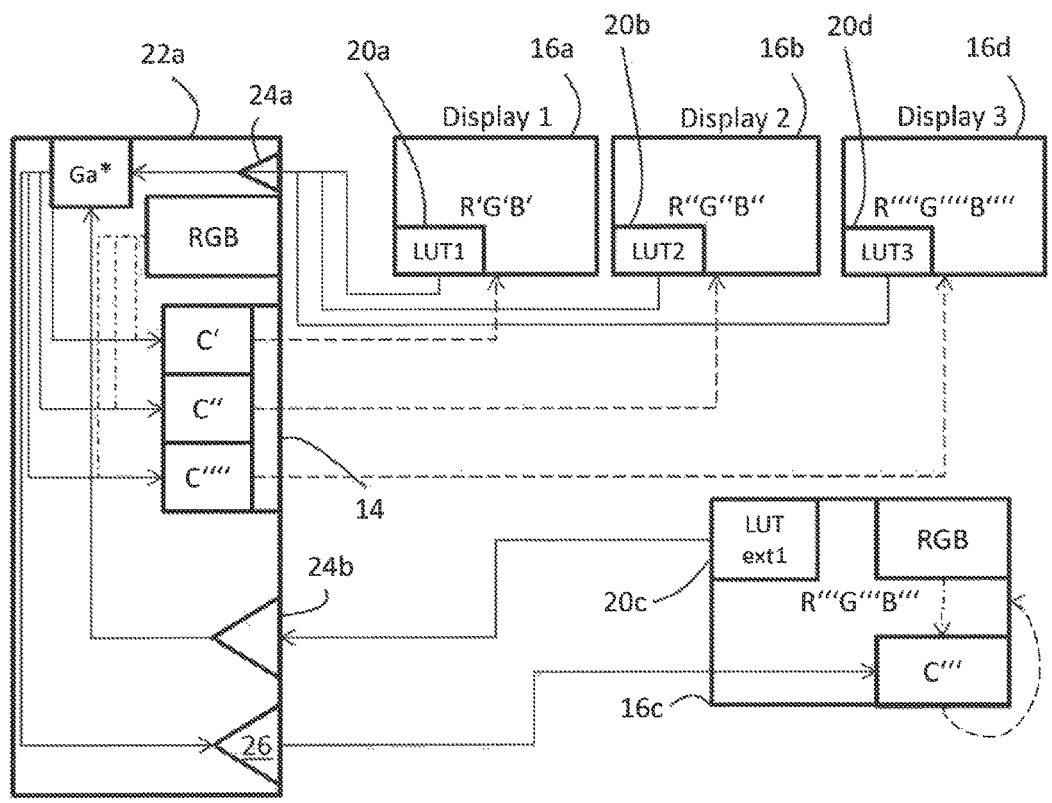
FIG. 11 shows a block diagram of a display color management scenario comprising a set of four display devices in accordance with an aspect of this disclosure.
Figure 12:
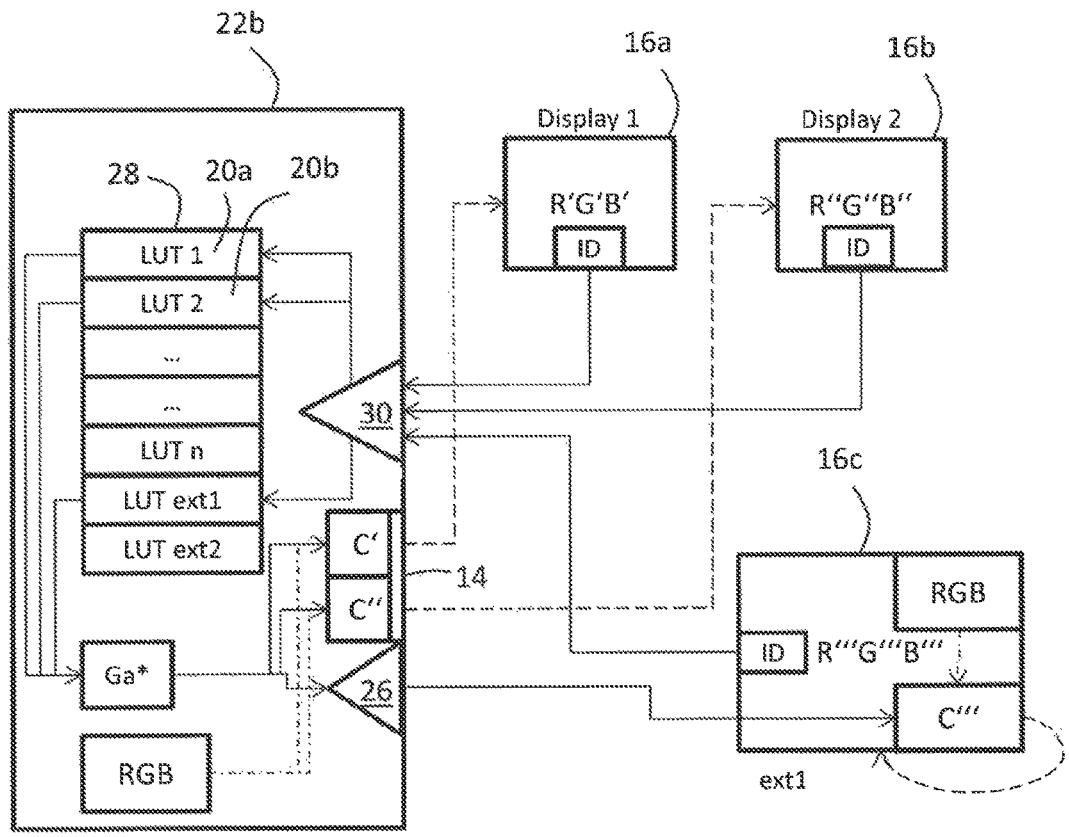
FIG. 12 shows a block diagram of a display color management scenario comprising a set of three display devices in accordance with an aspect of this disclosure.
Figure 13:
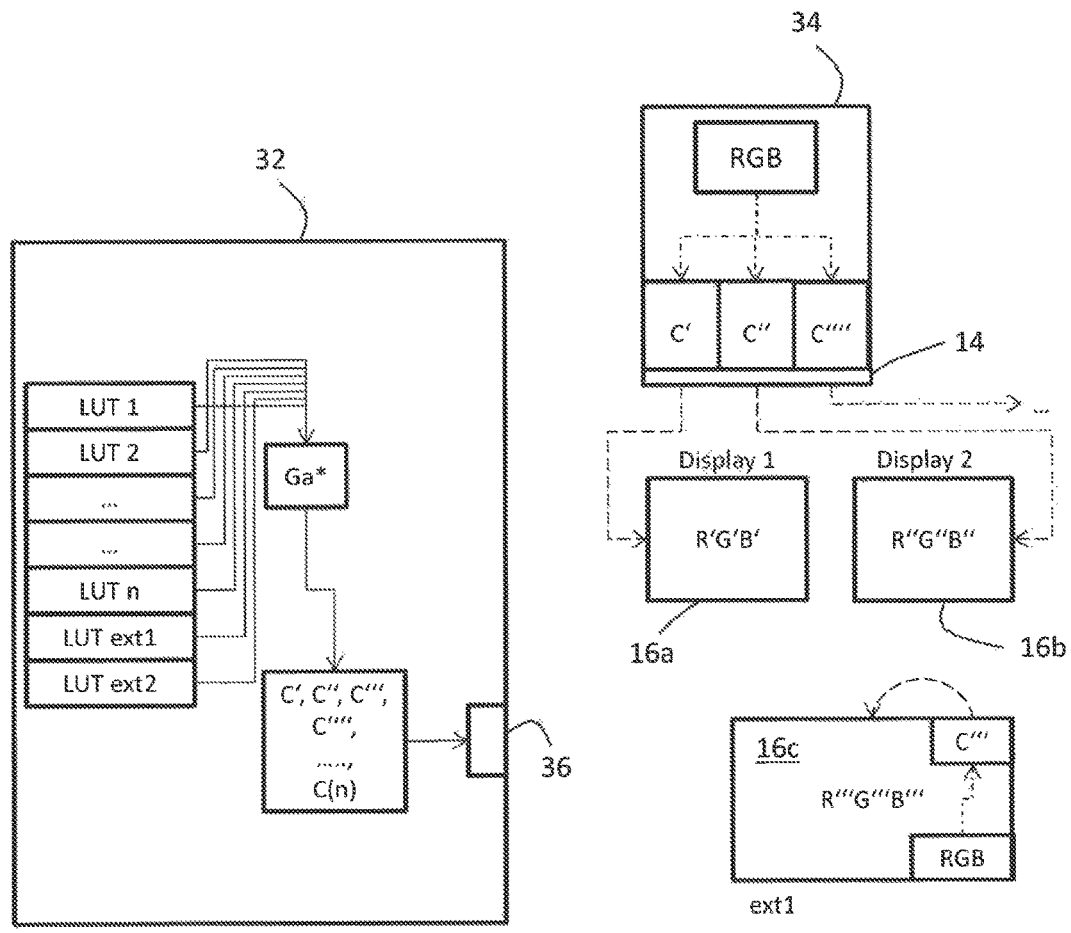
FIG. 13 shows a block diagram of a display color management scenario comprising a set of three display devices in accordance with an aspect of this disclosure.

In FIGS. 11, 12 and 13, examples for a respective display color management scenario are given. The person skilled in the art will appreciate that these examples can be arbitrarily combined with each other, depending on the given circumstances.

FIG. 11 shows an example of a display color management scenario according to the present disclosure. The set of display devices 16 of the scenario shown in FIG. 11 comprises four display devices 16a, 16b, 16c, and 16d. For example, the display devices 16a, 16b, and 16c may correspond to the display devices 16a, 16b, and 16c shown in FIG. 2. As explained above, it is desirable to provide a uniform color representation on all four display devices 16a, 16b, 16c, and 16d of the set of display devices 16. A control device 22a is provided, which fulfills the functions of a display color management device 2 and of a display controller device 8 according to the present disclosure. The control device 22a controls the display devices 16a, 16b, and 16d by transmitting dedicated output digital color values (indicated by dashed lines) to these display devices 16a, 16b, and 16d. Further, the control device 22a controls a color representation of the external display device (or "mobile display device") 16c by transmitting conversion information and/or information representative of the overlap color gamut Ga* to the display device 16c.

As shown in FIG. 11, a lookup table 20a, 20b, 20c, and 20d is stored in a memory of each display device 16a, 16b, 16c and 16d. These lookup tables 20 are transmitted via suitable data connections to the control device 22a, which comprises a color profile data input interface 24a, 24b, via which the color profile data in form of the lookup tables 20 is input into the control device 22a. In the control device 22a, the lookup tables 20 are evaluated and an overlap color gamut Ga* is determined based on the individual color gamuts of the display devices 16a, 16b, 16c, and 16d of the set of display devices 16. Thus, the control device 22a can individually determine the overlap color gamut Ga* of the display devices 16 that are actually connected to the control device 22a.

Based on the color profile data (in the form of lookup tables 20 or, alternatively, in the form of matrices) and based on the overlap color gamut Ga*, the control device 22a then determines conversion information for each of the connected display devices 16. The conversion information in this example and in the following examples may be determined, e.g., according to the method described above with reference to FIGS. 7 to 10. In the example shown in FIG. 11, the conversion information is represented by a conversion matrix C', C', C''', and C'''' for each display device 16 of the set of display devices 16. The conversion matrices may be 3×3 matrices, with which an input digital color value (e.g., an (R,G,B) vector) can be multiplied to obtain an output digital color value (e.g., an (R',G',B') vector) for the corresponding display device 16. Each of the conversion matrices C makes sure that an output digital color value (e.g., (R',G',B')) for one particular input digital color value (e.g., (R,G,B)) lies within the overlap color gamut Ga*. Therefore, the conversion of an input digital color value by a conversion matrix will not generate an output digital color value which leads to a physical color value of the corresponding display device 16 that lies far outside the boundaries of the overlap color gamut Ga*. As explained above, the necessary information for determining the overlap color gamut Ga* is derived from the color profile data, that may comprise, e.g., lookup tables 20.

Further, the conversion of one particular input digital color value (R,G,B) leads to respective dedicated output digital color values (R',G',B'), (R'',G'',B''), (R''',G''',B'''), (R'''',G'''',B'''') for each display device 16, which when input into the respective display device 16a, 16b, 16c, 16d, generate substantially the same physical color inside the overlap color gamut Ga*. As described above, the information necessary for creating the conversion information C may be derived from the color profile data, in which a relationship between digital color values and associated physical color values is indicated.

For generating substantially the same physical color, it is not necessary that the generated physical color of two display devices is exactly the same, but rather that a similar color impression is perceived by a viewer of the display devices 16. For example, in order to achieve a more precise mapping of input digital color values to dedicated output digital color values, the conversion information for each display device 16 may comprise a lookup table, in which individual digital color values are mapped to dedicated output digital color values. In that case, the conversion information C', C'', C''', and C'''' shown in FIG. 11 is indicative of such lookup tables.

As shown in FIG. 11, an RGB input digital color value (R,G,B) is generated by the control device 22a (indicated by dash-dotted lines). This input digital color value is then converted, based on the conversion information C, to individual output digital color values (indicated by dashed lines) for each display device. For example, the input digital color value (R,G,B) is converted, based on the conversion information C' for the first display 16a, to the dedicated output digital color value (R',G',B'). These dedicated output digital color values are then output via a color value output interface 14 and transmitted to the respective display devices 16, on which a corresponding physical color is generated. Due to the proper generation of conversion information C, the generated color values for each display device 16 represent substantially the same physical color inside the overlap color gamut Ga*.

With regard to the external display device 16c, the digital color values that shall be displayed by the external display device 16c can be generated by this display device 16c itself. For example, the external display device 16c may be a display device 16c of a tablet computer 19 (see FIG. 2).

The control device 22a comprises an output interface 26, that may be a conversion information output interface and/or an overlap color gamut output interface. Via the output interface 26, the conversion information C''' for the external display device 16c may be output to the external display device 16c. The conversion information C''' is then stored on a memory of the external display device 16c, such that it can be used by the external display device 16c for converting, based on the conversion information C''', an input digital color value (R,G,B) to a dedicated output digital color value (R''',G''',B'''). Additionally or alternatively, the output interface 26 may output information representative of the overlap color gamut Ga*, such that the external display device 16c generates the conversion information C''' based on the received information representative of the overlap color gamut Ga*.

As will be appreciated by those skilled in the art, each of the display devices 16a, 16b, 16c, and 16d of the set of display devices 16 may not only display one single color at the same time, but rather display an entire picture or video comprising a plurality of color values. However, it is desirable that elements of this picture or video are displayed in the same physical color on the individual display devices 16. For this, it is not necessary that one and the same picture or video is displayed on each display device 16 of the set of display devices 16, but rather that individual elements displayed on the display devices 16 are displayed in the same physical color. For example, all display devices 16a, 16b, 16c, 16d may display different user interfaces, e.g. at the same time. However, elements of each of these user interfaces shall be displayed in the same physical color or the same physical colors on the different display devices 16. As an example, a blue tone of a first user element displayed on a first display device shall substantially correspond to a blue tone of a second user element displayed on a second display device. This behavior can be achieved by the technique described herein, in which an individual conversion information C is provided for each display device 16.

FIG. 12 shows another example of a display color management scenario according to the present disclosure. Since the general arrangement is similar to the scenario described with regard to FIG. 11, the description of elements present in both examples will be omitted. Regarding these elements, the description given with reference to FIG. 11 also holds for the example of FIG. 12. In FIG. 12, a control device 22b is provided, which fulfills the functions of a display color management device 2 and of a display controller device 8. Contrary to the example of FIG. 11, in the example of FIG. 12, the color profile data 20 for the individual display devices 16 is stored in a database (data structure) 28 of the control device 22b. More precisely, the color profile data 20 is stored on a memory of the control device 22b. In the example of FIG. 12, the database 28 comprises lookup tables 20 for more display devices 16 than actually connected to the control device 22b. Preferably, the database 28 comprises lookup tables 20 for each display device that might be connected to the control device 22b. For example, a lookup table 20 for each display type of a particular manufacturer may be stored in the database 28. The connected display devices 16a, 16b, and 16c transmit a display identification (ID) to the control device 22b, where it is received by a display identification input interface 30. Based on this display identification, the control device 22b may access the corresponding lookup table 20 of the database 28. Then, the control device 22b can generate the overlap color gamut Ga* and the conversion information C', C'', and C''', wherein these steps are similar to those described with regard to FIG. 11 above.

The examples described in FIGS. 11 and 12 may be combined, e.g., such that some of the display devices 16 of the set of display devices 16 provide their color profile data 20 to the control device, whereas other display devices 16 of the set of display devices 16 provide a display identification (ID) to the control device, wherein the corresponding color profile data 20 is accessed from a database 28 based on the display identification (ID).

FIG. 13 shows another example of a display color management scenario according to the present disclosure. In the example of FIG. 13, a display color management device 32 and a display controller device 34 are provided as separate devices. The display color management device 32 of the example shown in FIG. 13 generates an overlap color gamut Ga* from lookup tables 20 for a plurality of display devices that might be used to form a set of display devices 16. For example, lookup tables for all known display devices may be considered that are suitable to be connected to a corresponding display controller device 34. Since the color gamut Ga* is determined based on the plurality of lookup tables 20, it might be much smaller than the overlap color gamuts Ga* determined in the examples of FIG. 11 or 12.

Based on the lookup tables 20 and based on the overlap color gamut Ga*, the display color management device 32 then determines conversion information C for each of the considered display devices 16, i.e., for each of the considered lookup tables 20. This conversion information is then output to the display controller device 34 via a conversion information output interface 36 of the display color management device 32. The conversion information C', C'' for the display devices 16a, 16b that are connected to the display controller device 34 may then be stored on a memory of the display controller device 34. Alternatively, the entire conversion information generated by the display color management device 32 may be stored on the display controller device 34. Further, conversion information C''' for an external (or mobile) display device 16c may be transmitted to the external display device 16c via the conversion information output interface 36 or via a suitable output interface of the display controller device 34.

In the scenario shown in FIG. 13, the display devices 16a, 16b, and 16c only display colors inside the overlap color gamut Ga* for the entire plurality of possible display devices that might not even be connected to the display controller device 34. Hence, an advantage of the example shown in FIG. 13 is that the conversion information C is generated once for all possible display devices 16 and that this step does not have to be repeated when a new display device 16 is connected.

Further, the display color management device of any of the examples described above may comprise an age information input interface (not shown in the figures). In particular, the control device 22a shown in FIG. 11 and/or the control device 22b shown in FIG. 12 may comprise such an age information input interface. Via the age information input interface, age information of at least one of the display devices 16 of the set of display devices 16 may be input. Similar to the display identification described above, the age information may be stored in a memory of the respective display device 16. From the age information, an age value (e.g., in days or years) can be derived for the corresponding display device 16. For example, the age information may correspond to an age value of the corresponding display device.

In all examples described herein, the conversion information C of one or more of the set of display devices 16 may be configured to compensate for an expected change of the color gamut of the respective display device 16 due to aging. For this, an age value t may be determined, which is representative of an age (e.g., in days or years) of a corresponding one of the set of display devices 16. In particular, the age value t may be representative of the hours of operation of the corresponding display device. The age value may be determined, e.g., based on the age information received via the age information input interface described above. The conversion information C(t) may comprise a function, which takes account of this aging value, such that the dedicated output digital color values (e.g., (R'(t),G'(t), B'(t))) depend on the age value t of the corresponding display device 16. For example, the color profile data (e.g., the lookup table 20) of a particular display device 16 may comprise time-dependent (i.e., age-dependent) information which indicates, how the color profile data changes over time. Based on this time-dependent color profile data, a time-dependent color gamut G(t) may be determined for the corresponding display device 16. Further, based on this time-dependent color gamut G(t), a time-dependent overlap color gamut Ga*(t) may be determined, which is then used to determine time-dependent conversion information C(t) for at least one or, e.g., for all display devices 16 of the set of display devices 16.

Figure 14A:
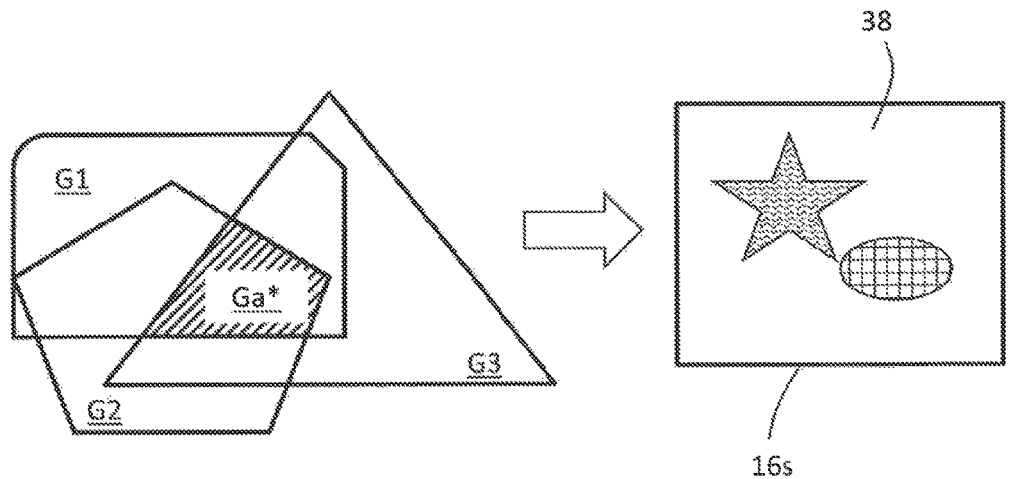
FIGS. 14a and 14b show schematic representations of a simulation tool in accordance with an aspect of this disclosure.
Figure 14B:
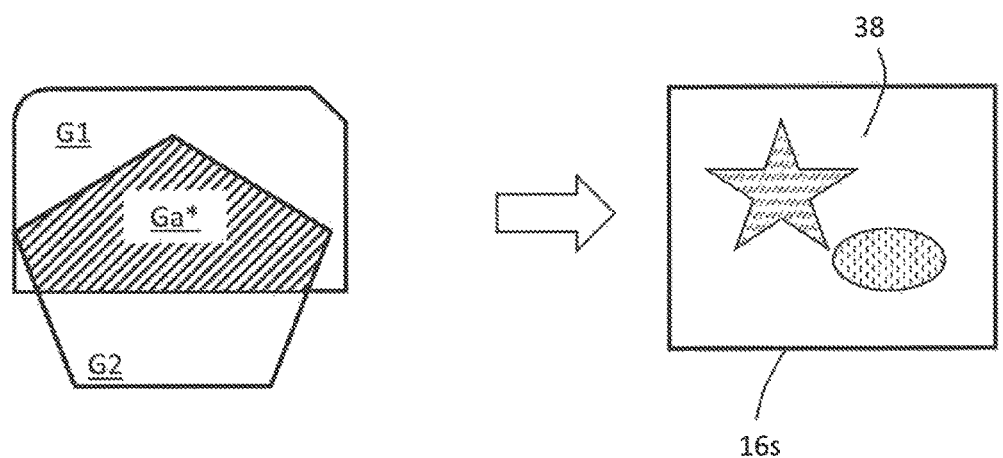

FIGS. 14a and 14b show a schematic representation of a simulation tool according to the present disclosure. The simulation tool may be carried out by a display color management device 2 according to the present disclosure. The simulation tool enables the simulation of different display color management environments with different sets of display devices 16.

In case a display color management device 2 according to the present disclosure is used for carrying out the simulation tool, the display color management device 2 further comprises a user interface configured to receive user input for selecting the considered set of display devices 16. By using the user interface, individual display devices for the set of display devices can be chosen by the user. For example, the set of display devices 16 may be determined by user input via a keyboard and/or a computer mouse. Further, the display color management device 2 for carrying out the simulation tool comprises a simulation color value output interface configured to output a test image (38) to a simulation display device 16s.

The simulation display device 16s is always part of the set of display devices considered by the display color management device 2 and, therefore, does not have to be explicitly selected by the user. The simulation display device 16s may be, e.g., a regular computer monitor preferably having a relatively large color gamut, such that a large variety of physical colors may be displayed by the simulation display device 16s. In particular, the simulation display device 16s may be a display device having a color gamut, which comprises all color gamuts of the considered set of display devices 16. However, the simulation tool also works with a simulation display device 16s having a smaller color gamut. For example, it is desirable to ensure that the color gamut of the simulation display device is at least larger than the overlap color gamut Ga* of the other display devices of the chosen set of display devices. Hence, the color gamut of the simulation display device 16s has no influence on the shape of the overlap color gamut Ga*, since the overlap color gamut Ga* is always completely part of the color gamut of the simulation display device 16s.

In the example of FIG. 14a, the user has selected three display devices for the set of display devices, wherein these display devices have the color gamuts G1, G2, and G3, respectively. The color gamut of the simulation display device 16s, which is also part of the set of display devices is not shown in FIG. 14a. As explained above, the color gamut of the simulation display device 16s may comprise the color gamuts G1, G2, and G3, or it may comprise at least the overlap color gamut Ga* of the other display devices of the chosen set of display devices. Similar to the display color management device described with regard to the previous examples, the display color management device 2 for the simulation tool then calculates the overlap color gamut Ga* for the considered set of display devices. The color profile data for each of the set of display devices may be stored in a memory of the color management device, similar to the example of FIG. 12. Based on the determined overlap color Gamut Ga*, the simulation tool then generates conversion information, at least for the simulation display device 16s. Similar to the examples described above, the conversion information is configured to convert input digital color values to dedicated output digital color values for the simulation display device 16s. When the output digital color values are input into the simulation display device 16s, the simulation display device 16s only displays physical colors substantially within the overlap color gamut Ga*.

A test image 38 is generated by the simulation tool, which may comprise a plurality of digital color values (e.g., a "rainbow" or a CIE chromaticity diagram). The test image 38 may also comprise, e.g., actual user interface (UI) elements, that shall be displayed by the set of display devices, e.g., in a motor vehicle. By using the simulation tool and by looking at the test image 38 displayed on the simulation display device 16s, the user may check how a particular image will look in a certain display environment (using a particular set of display devices).

FIG. 14b shows a situation, in which the user has decided to remove the third display device from the set of display devices, such that only the color gamuts G1 and G2 remain. As indicated in FIG. 14b, the resulting overlap color gamut Ga* is much larger than in the situation of FIG. 14a, such that more colors may be displayed by the set of display devices, i.e., a larger range of colors can be displayed. In this case, a test image (38) is displayed on the simulation display device 16s, which displays colors inside the larger overlap color gamut Ga* and the conversion information for the simulation display device 16s is different to the situation described with regard to FIG. 14a.

By using the simulation tool described above, a designer can easily observe, how a designed object (e.g., a user interface object) will look like in a certain display environment. Further, the user may directly observe, how the addition or removal of a certain display device affects the range of available colors.

With the approach proposed herein, a technique is provided which enables a uniform color display on different display devices of a set of display devices. Further, a simulation tool is provided, which allows the convenient simulation of color representation on a selected set of display devices.

The invention claimed is:

1. A display color management device comprising
a memory and a processor, wherein instructions are stored on the memory, which when carried out instruct the processor to:
   access color profile data for each display device of a set of display devices, wherein the color profile data is indicative of a relationship between digital color values input into a respective display device and associated physical color values displayed by the respective display device, and wherein the color profile data is representative of a color gamut of the respective display device;
   determine, based on the color profile data, an overlap color gamut as an overlap of all color gamuts of the set of display devices; and
   determine, based on the color profile data and based on the overlap color gamut, conversion information that includes a conversion matrix for each display device of the set of display devices, wherein each conversion matrix is configured to convert an input digital color value to dedicated output digital color values for a respective one of the display devices, wherein the output digital color values are associated with substantially the same physical color inside the overlap color gamut;
   wherein the display color management device further comprises a conversion information output interface configured, as including hardware, to output the conversion matrix for at least one of the set of display devices to an external device.

2. The display color management device according to claim 1,
   wherein the display color management device further comprises a color value output interface configured, as including hardware, to output the dedicated output digital color values to the two or more of the display devices, and
   wherein the instructions when carried out further instruct the processor to
      obtain the input digital color value;
      access the conversion matrix for the two or more of the display devices;
      convert, based on the conversion matrix for each of the two or more of the display devices, the input digital color value to the dedicated output digital color values; and
      transmit the dedicated output digital color values to the two or more of the display devices via the color value output interface.

3. The display color management device according to claim 1, further comprising
   an overlap color gamut output interface configured, as including hardware, to output information representative of the overlap color gamut.

4. The display color management device according to claim 1, further comprising
   a color profile data input interface configured, as including hardware, to receive the color profile data for at least one of the set of display devices from the respective display device.

5. The display color management device according to claim 1, wherein the instructions when carried out instruct the processor to
   access the color profile data for at least one of the set of display devices by accessing a data structure stored on the memory of the display color management device.

6. The display color management device according to claim 5, further comprising
   a display identification input interface configured, as including hardware, to receive a display identification from at least one of the set of display devices,
   wherein the color profile data for the at least one of the set of display devices is accessed based on the display identification information.

7. The display color management device according to claim 1, further comprising
   an age information input interface configured, as including hardware, to receive an age information from at least one of the set of display devices, wherein an age value indicative of an age of the respective display device is derivable from the age information.

8. The display color management device according to claim 1, wherein the conversion information is configured to compensate for an expected change of the color gamut of the respective display device due to aging.

9. The display color management device according to claim 1, further comprising
   a user interface configured, as including hardware, to receive user input for choosing individual display devices for determining the set of display devices; and
   a simulation color value output interface configured, as including hardware, to output a test image to a simulation display device, wherein the simulation display device is a display device of the set of display devices;
   wherein the instructions when carried out further instruct the processor to
      obtain a plurality of input digital color values for the test image;
      access the conversion information for the simulation display device;
      convert, based on the conversion information for the simulation display device, the plurality of input digital color values for the test image to dedicated output digital color values; and
      transmit the dedicated output digital color values to the simulation display device via the simulation color value output interface for displaying the test image on the simulation display device.

10. The display color management device according to claim 1, wherein the conversion matrix is determined by solving a set of linear system of equations based on the color profile data and the overlap color gamut.

11. A display color management method comprising the steps of
   accessing color profile data for each display device of a set of display devices, wherein the color profile data is indicative of a relationship between digital color values input into a respective display device and associated physical color values displayed by the respective display device, and wherein the color profile data is representative of a color gamut of the respective display device;
   determining, based on the color profile data, an overlap color gamut as an overlap of all color gamuts of the set of display devices;
   determining, based on the color profile data and based on the overlap color gamut, conversion information that includes a conversion matrix for each display device of the set of display devices, wherein each conversion matrix is configured to convert an input digital color value to dedicated output digital color values for a respective one of the display devices, wherein the output digital color values are associated with substantially the same physical color inside the overlap color gamut; and outputting the conversion matrix for at least one of the set of display devices to an external device.

12. The display color management method according to claim 11, further comprising the steps of obtaining the input digital color value;

accessing the conversion matrix for two or more of the display devices;

converting, based on the conversion matrix for the two or more of the display devices, the input digital color value to the dedicated output digital color values; and transmitting the dedicated output digital color values to the two or more of the display devices.

13. The display color management method according to claim 11, further comprising the step of outputting information representative of the overlap color gamut.

14. The display color management method according to claim 11, further comprising the step of receiving the color profile data for at least one of the set of display devices from the respective display device.

15. The display color management method according to claim 11, wherein accessing the color profile data for at least one of the set of display devices comprises accessing a data structure stored on the memory of the display color management device.

16. The display color management method according to claim 15, further comprising the step of receiving a display identification from at least one of the set of display devices, wherein the color profile data for the at least one of the set of display devices is accessed based on the display identification information.

17. The display color management method according to claim 11, further comprising the step of receiving an age information from at least one of the set of display devices, wherein an age value indicative of an age of the respective display device is derivable from the age information.

18. The display color management method according to claim 11, wherein the conversion information is configured to compensate for an expected change of the color gamut of the respective display device due to aging.

19. The display color management method according to claim 11, further comprising the steps of receiving user input for choosing individual display devices for determining the set of display devices;

obtaining a plurality of input digital color values for a test image to be displayed on a simulation display device, wherein the simulation display device is a display device of the set of display devices;

accessing the conversion information for the simulation display device;

converting the plurality of input digital color values for the test image to dedicated output digital color values by using the conversion information for the simulation display device; and transmitting the dedicated output digital color values to a simulation display device for displaying the test image on the simulation display device.

20. The display color management method according to claim 11, wherein the conversion matrix is determined by solving a set of linear system of equations based on the color profile data and the overlap color gamut.

* * * * *